(12) United States Patent
Ries

(10) Patent No.: US 7,686,597 B2
(45) Date of Patent: Mar. 30, 2010

(54) LINEAR DRIVE DEVICE PROVIDED WITH AN ARMATURE BODY HAVING A MAGNET CARRIER

(75) Inventor: Guenter Ries, Erlangen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 113 days.

(21) Appl. No.: 10/591,082

(22) PCT Filed: Mar. 3, 2005

(86) PCT No.: PCT/EP2005/050956

§ 371 (c)(1),
(2), (4) Date: Aug. 29, 2006

(87) PCT Pub. No.: WO2005/086326

PCT Pub. Date: Sep. 15, 2005

(65) Prior Publication Data

US 2007/0188277 A1    Aug. 16, 2007

(30) Foreign Application Priority Data

Mar. 3, 2004    (DE) .................. 10 2004 010 404

(51) Int. Cl.
*H02K 33/16*    (2006.01)
*F04B 17/04*    (2006.01)

(52) U.S. Cl. .................. 417/416; 335/229; 310/15
(58) Field of Classification Search ......... 335/229–235; 310/12–35; 417/415–419

See application file for complete search history.

(56) References Cited

U.S. PATENT DOCUMENTS

| 5,559,378 A | 9/1996 | Oudet et al. |
| 5,642,088 A | 6/1997 | Unger |
| 2003/0173834 A1* | 9/2003 | McGill et al. .................. 310/12 |

FOREIGN PATENT DOCUMENTS

| EP | 1 176 703 | 1/2002 |
| JP | 1-190979 | 8/1989 |
| JP | 1-308161 | 12/1989 |
| JP | 2000-253640 | 9/2000 |
| JP | 2002-31054 | 1/2002 |

OTHER PUBLICATIONS

International Search Report PCT/EP2005/050956.

* cited by examiner

*Primary Examiner*—Ramon M Barrera
(74) *Attorney, Agent, or Firm*—James E. Howard; Andre Pallapies

(57) ABSTRACT

A linear drive device comprising at least one excitation winding for producing a variable magnetic field and is provided with an associated yoke body conducting a magnetic flux and an armature body which comprises a magnet carrier provided with at least two permanent magnet parts, preferably in the form of a plate, and to which an axial oscillation movement can be transferred by the magnetic field of the excitation winding. In order to avoid eddy currents in the magnet carrier, it is made of an electrically insulating material at least in the part thereof which penetrates into the magnetic field area defined by the pole surfaces of the yoke body and the excitation winding or which are arranged in said area. The magnet parts can be provided with ferromagnetic covers.

27 Claims, 4 Drawing Sheets

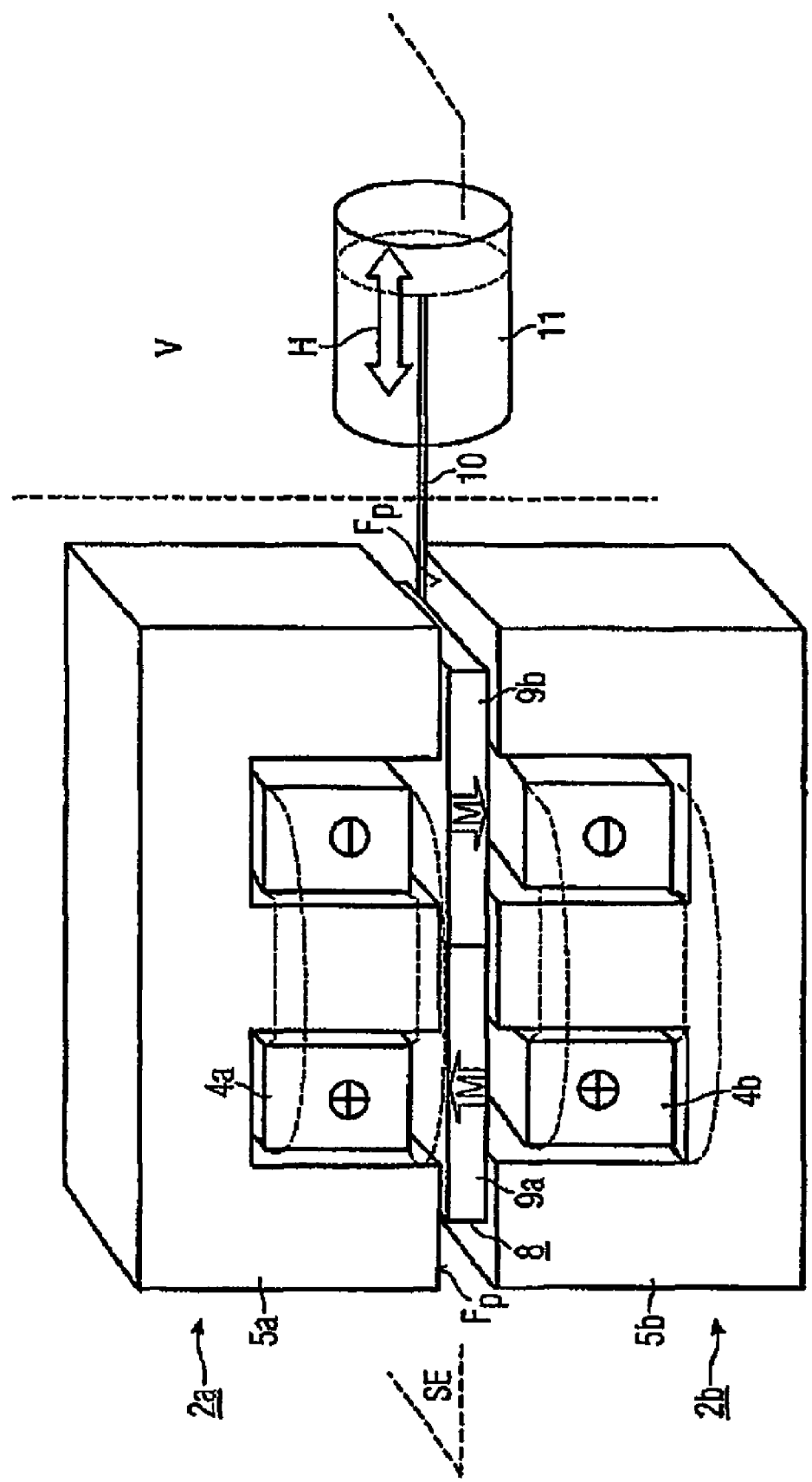

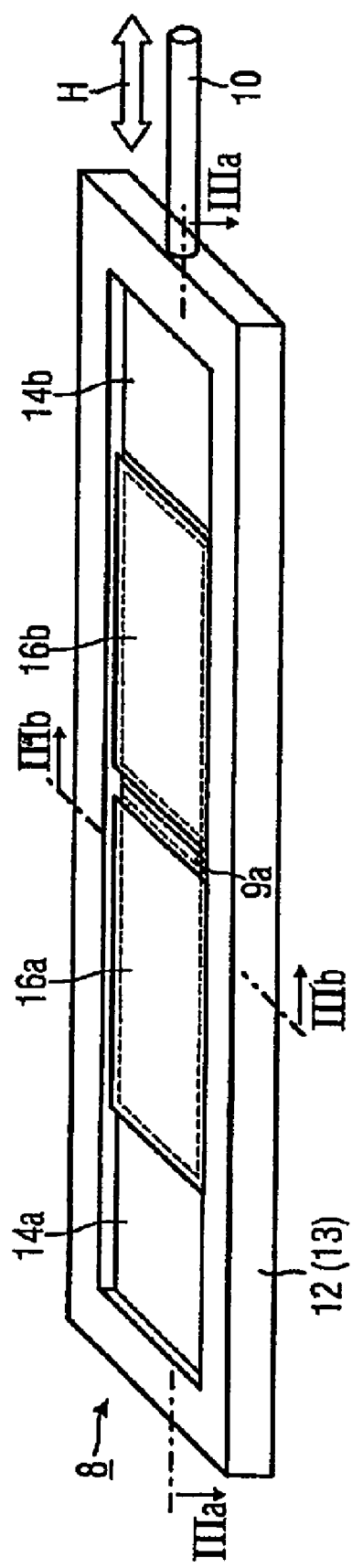

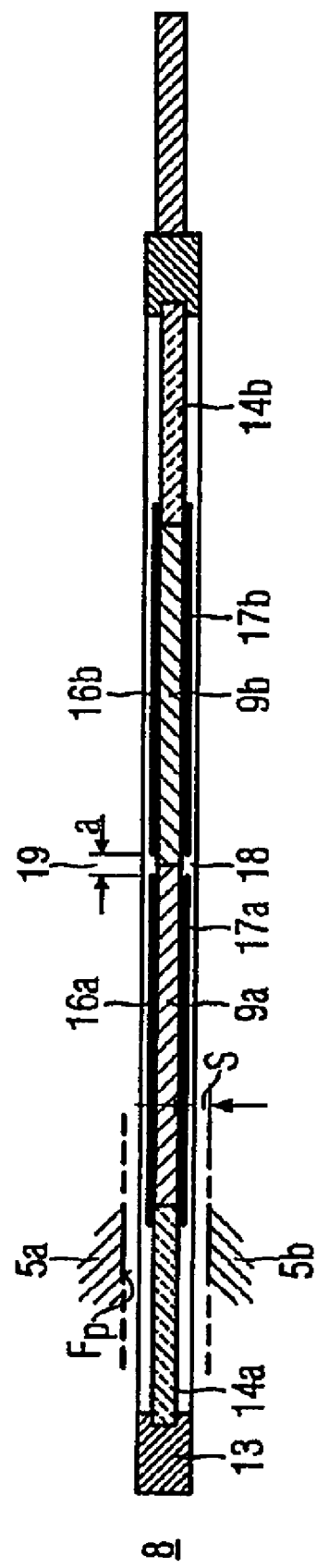

LINEAR DRIVE DEVICE PROVIDED WITH AN ARMATURE BODY HAVING A MAGNET CARRIER

Figure 3B:
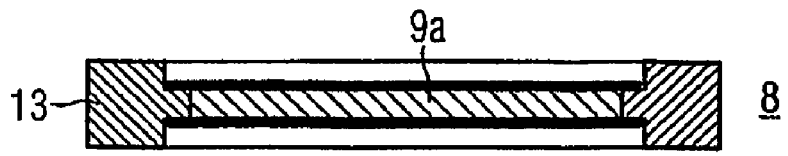

The invention relates to a linear drive device comprising at least one excitation winding for producing a variable magnetic field and provided with at least one associated magnetic-flux-carrying yoke body as well as an armature body which comprises a magnet carrier provided with at least two permanent magnet parts and to which an axial oscillation movement can be transferred by the magnetic field of the excitation winding. A corresponding drive device is deduced from U.S. Pat. No. 5,559,378 A.

Corresponding linear drives are used in particular to set pump plungers of compressors in linear oscillating vibration. The system comprising such a compressor and a linear drive device is therefore also designated as a linear compressor (see, for example, JP 2002-031054 A). In corresponding known linear compressors, the armature body capable of oscillating, forms a spring-mass system designed for a certain oscillation frequency.

The known drive device comprises at least one excitation winding in a laminated iron yoke core in an E-shape. Its magnetic field exerts a force which depends on the direction of the current on two alternately polarized plate-shaped permanent magnets or on a linearly movable magnet carrier of an armature body, which can be used to drive, for example, a pump plunger of a compressor.

The air gap between the pole surfaces of such a yoke body and the surface of the permanent magnets represents an additional resistance in the magnet circuit which reduces the magnetic field strength produced by the excitation winding in the air gap and thus correspondingly reduces the driving force.

During the oscillating movement of the armature body, lateral parts of its magnet carrier dip into the air gap field at the pole surfaces of the yoke carrier, inducing eddy currents, losses and a corresponding braking force in electrically conductive materials. A corresponding effect can be observed in known drive units whose magnet carrier is generally made of highly conducting aluminium, and the permanent magnets provided with thin glass-fibre reinforced plastic covers can be stuck in recesses of the support.

It is thus the object of the present invention to construct the linear drive device provided with the features specified initially such that the aforementioned induced braking force is reduced.

This object is achieved according to the invention with the features specified in claim 1. Accordingly, in the drive device, the magnet carrier should be constructed, at least in parts, of an electrically insulating material which dips into the magnetic field area defined by the pole surfaces of the yoke body and the excitation winding or comes to rest therein.

The advantages associated with this configuration of the drive device can be seen in particular in that as a result of using insulating material for the magnet carrier, no eddy currents are induced therein under the pole surfaces. Thus, no additional braking force is induced by this region of the magnet carrier.

Advantageous embodiments of the linear drive device according to the invention are obtained from the dependent claims. In this case, the embodiment according to claim 1 can be combined with the features of one of the dependent claims or preferably also with those of several dependent claims. Accordingly, the following features can be additionally provided for the drive device:

The magnet carrier can consist entirely of an insulating material. Instead, it is also possible that this consists of metal and the parts of the magnet carrier which dip into the magnetic field area of the yoke body and/or the excitation winding are constructed of an insulating material. Consequently, no eddy currents are induced in these insulating material parts under the pole surfaces.

It is particularly advantageous if each magnet part with respect to the associated yoke body and/or the excitation winding are covered by a magnet cover made of a ferromagnetic sheet or a corresponding layer, the magnet covers being spaced axially apart by means of a spacing joint. These ferromagnetic covers are used firstly for secure fixing of the magnet parts in or on the magnetic carrier. Secondly, they reduce the effective magnetic air gap, increase the field of the excitation winding(s) and thus the driving force.

In this case, the ferromagnetic magnet covers can advantageously be spaced apart from one another by a distance a>2 s, where s is the distance from the surface to the pole surfaces of the yoke body. A magnetic short circuit can thus be avoided between the neighbouring magnet parts.

Each of the ferromagnetic magnet covers advantageously covers a larger area than the respectively associated magnet part.

An Fe—Si alloy is preferably used as the material for the ferromagnetic magnet covers.

The thickness of the ferromagnetic covers is advantageously selected between 0.2 mm and 1.5 mm, preferably between 0.35 and 1 mm.

The magnet parts are appropriately embodied as plate- or sheet-shaped.

The armature body constructed according to the invention is preferably rigidly connected to a pump plunger of a compressor.

Further advantageous embodiments of the linear drive device according to the invention are deduced from the dependent claims not discussed previously and the drawings.

Figure 4A:
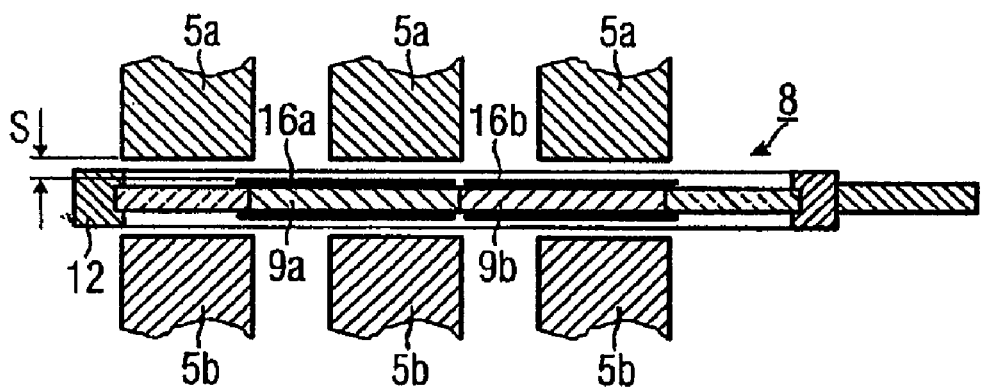
Figure 4B:
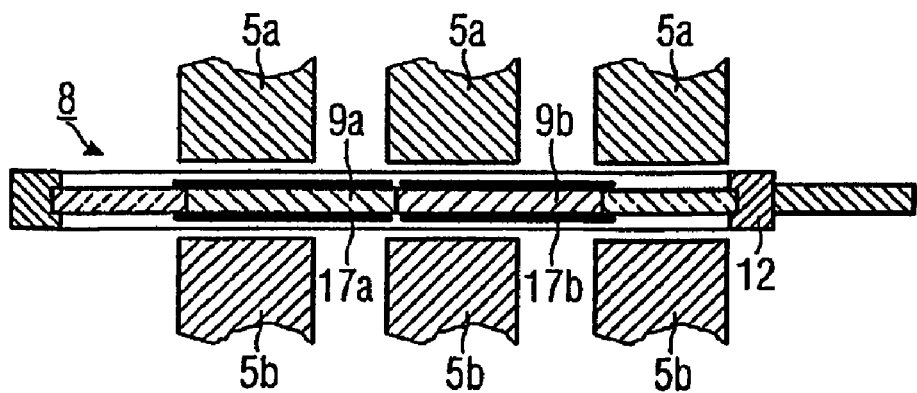

The invention is explained in detail hereinafter using preferred exemplary embodiments with reference to the drawings. In the figures:

FIG. 1 is a schematic oblique view of a linear drive device according to the invention, FIG. 2 is an oblique view of an armature body of the drive device, FIG. 3 shows, in part FIGS. 3a and 3b, a longitudinal section or cross-section through the armature body according to FIG. 2, and FIG. 4 shows, in part FIGS. 4a and 4b two different positions of the armature body according to FIGS. 2 and 3 with respect to two opposite yoke bodies.

In the figures corresponding parts are each provided with the same reference numerals.

In the linear drive device according to the invention shown in FIG. 1, embodiments known per se such as those provided for linear compressors are assumed. Essentially only an upper and a lower part 2a or 2b of such a drive device 2 can be seen from the oblique view in the figure, these parts being embodied symmetrically with respect to a plane of symmetry SE. The drive device 2 comprises two symmetrically opposed excitation coils 4a and 4b, each having at least one magnetic-flux-carrying yoke body 5a or 5b. The yoke bodies, for example, have the known E-shape. Located in a central channel-like or slit-like opening 7 between these yoke bodies or their pole surfaces $F_p$ is a magnetic armature or armature body 8 comprising two permanent magnets 9a and 9b, for example. Their anti-parallel-directed magnetizations M perpendicular to the plane of symmetry are indicated by the arrowed lines. The armature body 8, designated as "armature carriage" and described in detail in the following figures can execute an oscillating movement in the axial direction in the variable magnetic field of the excitation coils 4a and 4b. This armature body has axially lateral extension parts 10 not described in detail which are advantageously rigidly connected to a pump plunger 11 of a compressor V not shown in detail in the figure. This pump plunger consequently executes the axially oscillating movement of the armature part 8 about an armature stroke H.

FIGS. 2, 3a and 3b show detailed views of an armature body 8 or carriage constructed according to the invention. This comprises a magnet carrier 12 which should consist of an electrically insulating material, at least in parts, which dips into the magnetic field area defined by the pole surfaces of the yoke body and excitation windings or comes to rest therein. The field lines directed perpendicularly to the armature body define the limits of the region. Said parts advantageously extend from the insulating material beyond the limits of this region. The magnet carrier 12 comprises a frame portion 13, e.g. made of aluminium in which web-like or plate-shaped insulating material inserts 14a and 14b are fixed in axially opposed front regions. Naturally, the frame portion 13 can also be made completely of an insulating material, where the insulating material inserts can then be integrated parts of the frame portion. Two plate-shaped permanent magnet parts 9a and 9b arranged one after the other in the axial direction are clamped between the two insulating material inserts 14a and 14b or fixed in some other fashion.

As can be further deduced from FIGS. 2, 3a and 3b, each of the plate-shaped magnet parts 9a and 9b can be covered with a magnet cover made of a ferromagnetic material on each surface facing a yoke body with excitation winding. Since according to the selected exemplary embodiment, two yoke bodies 5a and 5b which are symmetrical with respect to the plane of symmetry SE should be provided between which the armature body 8 can move in an oscillating manner (see FIG. 1), ferromagnetic covers 16a or 16b and 17a or 17b are applied to both flat sides of each magnet part 9a and 9b. These reduce the respective effective magnetic air gap, increasing the field generated by the excitation windings. Thus, a higher axial driving force on the armature body 8 or its magnet parts is obtained.

The ferromagnetic covers 16a, 16b, 17a and 17b can in particular be embodied in the form of a metal sheet or a corresponding layer. Preferably provided for this purpose are ferromagnetic sheets of relatively low electrical conductivity (below that of the known aluminium), in particular so-called electric sheet made of an Fe—Si alloy, the thickness d of this sheet metal generally being between 0.2 mm and 1.5 mm, preferably between 0.35 mm and 1 mm. It is also advantageous if these sheets project somewhat over the associated magnet parts on three sides, they at least partly cover the edge of the recesses in the frame portion 13 in which the magnet parts 9a and 9b are to be fitted and are fixed to the magnet parts in the carrier frame, for example, are glued therein. The associated ferromagnetic sheets 16a and 16b or 17a and 17b are mutually spaced in the area of the centre at a joint 18 between the two oppositely magnetized permanent-magnet parts 9a and 9b to thus prevent a magnetic short circuit. The axial extension a of a corresponding spacing joint 19 should preferably be selected so that this is twice the spacing s from the surface to the pole surface $F_p$ of the corresponding yoke body 5a or 5b.

FIGS. 4a and 4b each show the maximum deflection of the armature body 8 with its magnet carrier 12 as shown in FIGS. 2, 3a and 3b during an oscillating movement under the pole surfaces $F_p$ of the yoke bodies 5a and 5b.

REFERENCE LIST

2 Drive device
2a Upper part
2b Lower part
4a, 4b Excitation windings
5a, 5b Yoke body
7 Gap
8 Armature body
9a, 9b Magnet parts
10 Extension part
11 Pump plunger
12 Magnet carrier
13 Frame portion
14a, 14b Insulating material inserts
16a, 16b Ferromagnetic covers
17a, 17b Ferromagnetic covers
18 Joint
19 Spacing joint
M Magnetizations
$F_p$ Pole surfaces
SE Plane of symmetry
V Compressor
H Armature stroke
a Extension
s Distance

The invention claimed is:

1. A linear drive device comprising:
an excitation winding producing a variable magnetic field and including an associated magnetic-flux-carrying yoke body having pole surfaces; and
an armature body including a magnet carrier having at least two permanent magnet parts and an axial oscillation movement being transferable to the at least two permanent magnet parts by the variable magnetic field of the excitation winding, the magnet carrier including an electrically conductive exterior frame and electrically insulating material mounted inside the exterior frame and holding the two permanent magnet parts on the exterior frame, wherein during axial oscillation movements of armature body, the exterior frame remains substantially outside the magnetic field area defined by the pole surfaces of the yoke body and the excitation winding to thereby substantially avoid an induction of eddy currents adjacent the pole surfaces of the yoke body.

2. The device according to claim 1, wherein the magnet carrier includes a metal material forming the exterior frame, and wherein the parts of the magnet carrier which extend into the magnetic field area of the yoke body and the excitation winding exclude the exterior frame.

3. The device according to claim 1, wherein each magnet part with respect to the associated yoke body and the excitation winding is covered by a magnet cover made of a ferromagnetic layer, a spacing joint axially spacing apart the magnet covers.

4. The device according to claim 3, wherein the ferromagnetic magnet covers are spaced apart from one another by a distance a>2 s, where s is the distance of the magnet covers from the respective pole surface of the associated yoke body.

5. The device according to claim 3, wherein each magnet cover covers a larger area than the respectively associated magnet part.

6. The device according to claim 3, wherein the magnet covers include an Fe—Si alloy.

7. The device according to claim 3, wherein the magnet covers each have a thickness between 0.2 mm and 1.5 mm.

8. The device according to claim 7, wherein the magnet covers each have a thickness between 0.35 and 1 mm.

9. The device according to claim 1, wherein the magnet parts are embodied as plate- or sheet-shaped.

10. The device according to claim 1, further comprising a plane of symmetry and the device being constructed symmetrically with respect to the plane of symmetry.

11. The device according to claim 1, wherein the armature body is rigidly connected to a pump plunger of a compressor.

12. The device according to claim 1, wherein side edges of the magnet parts abut one another.

13. The device according to claim 12, further comprising a plurality of magnet covers made of a ferromagnetic layer, wherein each magnet cover is mounted on a surface of a magnet part such that the magnet cover is positioned between the magnet part and an adjacent yoke body, and wherein the side edges of adjacent magnet covers are spaced apart from one another.

14. The device of claim 1, wherein the yoke body comprises an E-shaped frame with the excitation winding mounted around a center leg of the E-shaped frame.

15. The device of claim 1, wherein the excitation winding comprises a first excitation winding mounted on a first yoke body and a second excitation winding mounted on a second yoke body, wherein pole surfaces of the first and second yoke bodies face each other across an air gap, and wherein the armature body is positioned in the air gap between the first and second yoke bodies.

16. The device of claim 15, wherein the device is symmetrical about a plane of symmetry passing through a center of the air gap.

17. A linear drive device comprising:
an excitation winding producing a variable magnetic field having a longitudinal extent along a longitudinal axis, the excitation winding including an associated magnetic-flux-carrying yoke body having a pair of pole surfaces axially spaced from one another relative to the longitudinal axis; and
an armature body including a magnet carrier having a plurality of permanent magnet parts, an electrically conductive exterior frame, and a pair of electrically insulating portions that hold the permanent magnet parts in a central portion of the exterior frame, the armature body being movable in an axial oscillation movement under the control of the variable magnetic field of the excitation winding, the pair of electrically insulating portions being axially spaced from one another relative to the longitudinal axis and at least one of the plurality of permanent magnet parts being disposed axially intermediate the pair of electrically insulating portions, and wherein during the axial oscillation movement each one of the pair of electrically insulating portions is disposed to at least partially extend into a respective magnetic field area defined by a respective one of the pair of pole surfaces of the yoke body and the excitation winding while the exterior frame remains outside the magnetic field area.

18. The device according to claim 17, wherein the exterior frame of the magnet carrier includes a metal material and wherein the parts of the magnet carrier which extend into the magnetic field area of the yoke body and the excitation winding comprise the plurality of permanent magnet parts and the pair of electrically insulating portions.

19. The device according to claim 17, wherein each magnet part is covered by a magnet cover made of a ferromagnetic layer, a spacing joint axially spacing apart side edges of adjacent magnet covers.

20. The device according to claim 19, wherein the ferromagnetic magnet covers are spaced apart from one another by a distance a>2 s, where s is the distance of the magnet covers from the respective pole surface of the associated yoke body.

21. The device according to claim 19, wherein the magnet covers include an Fe—Si alloy.

22. The device according to claim 19, wherein the magnet covers each have a thickness between 0.2 mm and 1.5 mm or a thickness between 0.35 and 1 mm.

23. The device according to claim 19, wherein side edges of adjacent permanent magnet parts abut one another.

24. The device according to claim 17, wherein the armature body is rigidly connected to a pump plunger of a compressor.

25. The device of claim 17, wherein the yoke body comprises an E-shaped frame with the excitation winding mounted around a center leg of the E-shaped frame.

26. The device of claim 17, wherein the excitation winding comprises a first excitation winding mounted on a first yoke body and a second excitation winding mounted on a second yoke body, wherein pole surfaces of the first and second yoke bodies face each other across an air gap, and wherein the armature body is positioned in the air gap between the first and second yoke bodies.

27. The device of claim 26, wherein the device is symmetrical about a plane of symmetry passing through a center of the air gap.

* * * * *